(12) United States Patent
Tavallaei et al.

(10) Patent No.: US 9,344,012 B2
(45) Date of Patent: May 17, 2016

(54) CONTROL SYSTEM FOR ULTRASONIC MOTORS

(71) Applicant: University of Western Ontario, London (CA)

(72) Inventors: Mohammad Ali Tavallaei, London (CA); Maria Drangova, London (CA)

(73) Assignee: Vital Biomedical Technologies Inc., London (CA)

( * ) Notice: Subject to any disclaimer, the term of this patent is extended or adjusted under 35 U.S.C. 154(b) by 451 days.

(21) Appl. No.: 13/764,425

(22) Filed: Feb. 11, 2013

(65) Prior Publication Data

US 2013/0207574 A1    Aug. 15, 2013

Related U.S. Application Data

(60) Provisional application No. 61/596,746, filed on Feb. 9, 2012.

(51) Int. Cl.
*H01L 41/04* (2006.01)
*H02N 2/00* (2006.01)
*H02N 2/14* (2006.01)

(52) U.S. Cl.
CPC ............... *H02N 2/001* (2013.01); *H02N 2/142* (2013.01)

(58) Field of Classification Search
USPC .......................................................... 318/116
See application file for complete search history.

(56) References Cited

U.S. PATENT DOCUMENTS

| | | | |
|---|---|---|---|
| 5,258,694 A | 11/1993 | Ohnishi et al. | |
| 6,023,145 A | 2/2000 | Karaaslan et al. | |
| 6,153,997 A * | 11/2000 | Kobayashi et al. | ........... 318/560 |
| 6,894,422 B2 | 5/2005 | Kato | |
| 6,984,919 B2 | 1/2006 | Iino et al. | |
| 7,035,694 B2 | 4/2006 | Ramamoorthy et al. | |
| 7,061,587 B2 | 6/2006 | Dams | |
| 7,719,165 B2 | 5/2010 | Geyer et al. | |
| 7,728,484 B2 | 6/2010 | Bachmaier et al. | |
| 7,979,143 B2 | 7/2011 | Koo et al. | |
| 8,253,370 B2 | 8/2012 | Araki | |
| 2001/0013765 A1 * | 8/2001 | Yamamoto et al. | ........... 318/600 |

* cited by examiner

*Primary Examiner* — Kawing Chan
(74) *Attorney, Agent, or Firm* — Dicke, Billig & Czaja, PLLC

(57) ABSTRACT

A method for controlling an ultrasonic motor coupled to a motor driver circuit, comprises obtaining a position of a first encoder coupled to the ultrasonic motor, calculating an error between the position of the first encoder and a target position, and sending a control signal to the motor driver circuit to control the ultrasonic motor to adjust the position of the first encoder based the calculated error.

14 Claims, 4 Drawing Sheets

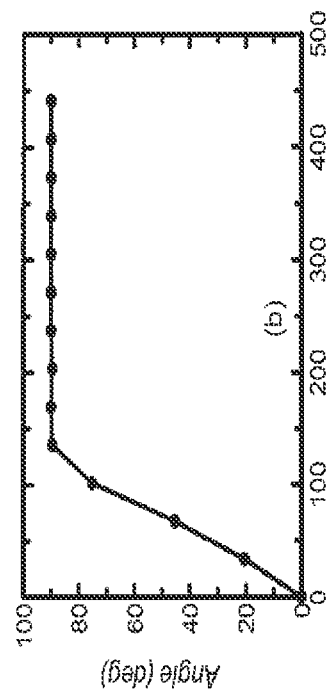
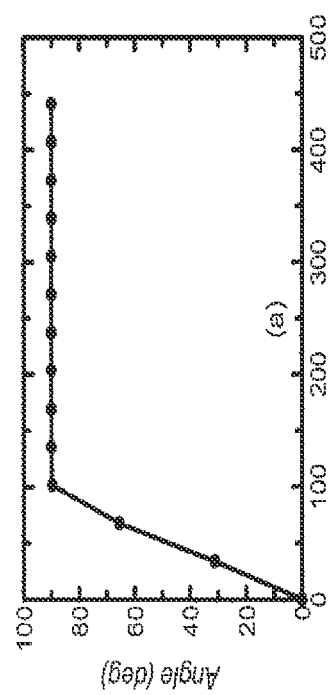
FIG. 3a
FIG. 3b

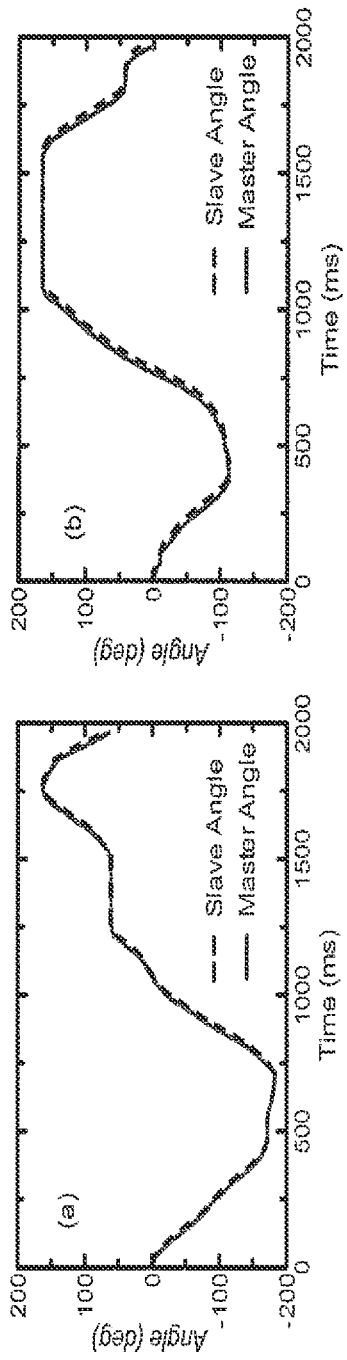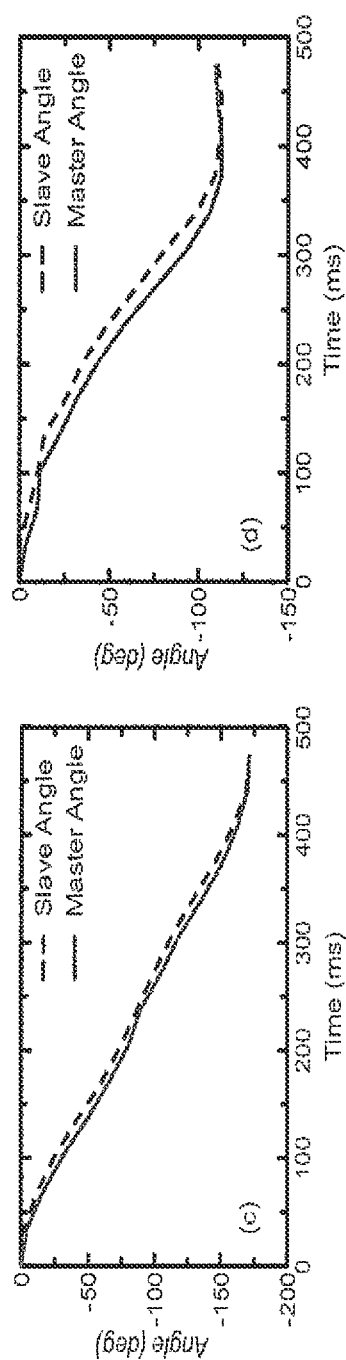

CONTROL SYSTEM FOR ULTRASONIC MOTORS

CROSS-REFERENCE TO RELATED APPLICATIONS

This application claims priority from U.S. Provisional Application No. 61/596,746, filed Feb. 9, 2012 the teaching of which are incorporated herein by reference.

FIELD OF THE INVENTION

The present invention relates to control systems and in particular to a control system for ultrasonic motors.

BACKGROUND OF THE INVENTION

Various control systems have been developed for controlling ultrasonic motors. Examples of these control systems include digital controllers for piezo stages, ceramic servo motors, and motor controllers. Some of these controllers do not allow for reference inputs being applied from an external input. In other controllers, the inputs cannot be updated until the motor reaches a fixed reference point, and as a result these controllers do not allow for a time varying input.

U.S. Pat. No. 5,258,694 to Ohnishi et al. discloses a control device for an ultrasonic motor for controlling to drive the ultrasonic motor according to a logical and operation between a control pulse having a duty ratio changing from 100% to 0% according to a moving position of the ultrasonic motor and a driving signal having a resonance frequency of the ultrasonic motor. Accordingly, after starting the ultrasonic motor at a maximum speed, a moving speed of the ultrasonic motor can be gradually reduced until it reaches a target position, and when reaching the target position, the ultrasonic motor can be stopped precisely at the target position.

U.S. Pat. No. 6,894,422 to Kato discloses an ultrasonic-motor control system that includes an ultrasonic motor, a controller which starts the ultrasonic motor by changing a drive frequency of the ultrasonic motor from an initial drive frequency, a calculation device which calculates an initial drive frequency data based on a drive frequency at the commencement of rotation of the ultrasonic motor, and a setting device which sets the initial drive frequency based on the initial drive frequency data at a subsequent commencement of driving of the ultrasonic motor.

U.S. Pat. No. 6,984,919 to Iino et al. discloses a control system provided with a positioning mechanism including plural ultrasonic motors in the device, which can keep good operational stability as compared with a conventional system with a servo mechanism, is of an energy saving type suppressing power consumption and is compact in structure including the motor and a control circuit therefor. A control circuit in a control system uses a common drive control circuit for a plurality of ultrasonic motors among the positioning mechanisms in which when the drive control circuit inputs a signal that specifies any ultrasonic motor and a desired-position designation signal, the drive control circuit conducts control operation that transmits an on signal to a driver of the subject motor to start the driving, and stops the driving when the motor reaches a desired position while receiving a position detection signal. Thus, the control system has a function of transmitting a signal indicating that the positioning operation is being conducted from a time point when commands are received to a time point when the positioning operation is completed. Then, an error signal is outputted when the motor is out of the desired position.

U.S. Pat. No. 8,253,370 to Araki discloses a microcomputer that controls an ultrasonic motor and includes a storage unit that stores a compare register value, and a digital/analog (D/A) conversion set value, a D/A converter that generates an amplitude control signal with an amplitude value corresponding to the D/A conversion set value, a timer that generates a pulse width modulation (PWM) signal with a frequency corresponding to the compare register value, a central processing unit (CPU) that reads the D/A conversion set value, and the compare register value from the storage unit, and that sets the D/A conversion set value and the compare register value to the D/A converter and the timer, respectively, and an output circuit that generates the control signal with the amplitude of the amplitude control signal, and the frequency of the PWM signal, in response to the amplitude control signal and the PWM signal.

It is an object to provide a novel control system for ultrasonic motors.

SUMMARY OF THE INVENTION

Accordingly, in one aspect there is provided a method for controlling an ultrasonic motor coupled to a motor driver circuit, comprising obtaining a position of a first encoder coupled to the ultrasonic motor, calculating an error between the position of the first encoder and a target position, and sending a control signal to the motor driver circuit to control the ultrasonic motor to adjust the position of the first encoder based the calculated error.

In an embodiment the method comprises comparing the calculated error to a threshold value. In the event that the calculated error is greater than the threshold value, the control signal adjusts the speed of the ultrasonic motor to a maximum value. In the event that the calculated error is less than the threshold value, the control signal adjusts the speed of the ultrasonic motor based on a proportional integral derivative. The method further comprises determining a direction of rotation of the ultrasonic motor based on a sign of the calculated error.

According to another aspect there is provided a control system comprising an ultrasonic motor coupled to a motor driver circuit, a first encoder coupled to the ultrasonic motor, and processing structure configured to obtain a position of the first encoder, calculate an error between the position of the first encoder and a target position, and send a control signal to the motor driver circuit to control the ultrasonic motor to adjust the position of the first encoder based the calculated error.

According to another aspect there is provided a non-transitory computer readable medium embodying a computer program having computer program code for execution by a computer to perform a method for controlling an ultrasonic motor coupled to a motor driver circuit, the method comprising obtaining a position of a first encoder coupled to the ultrasonic motor, calculating an error between the position of the first encoder and a target position, and sending a control signal to the motor driver circuit to control the ultrasonic motor to adjust the position of the first encoder based the calculated error.

BRIEF DESCRIPTION OF THE DRAWINGS

Embodiments will now be described more fully with reference to the accompanying drawings in which:

FIGS. 3a and 3b are graphs showing a slave encoder step response during no load and load conditions, respectively, for a slave encoder forming part of the control system of FIG. 1; and FIGS. 4a and 4b are graphs showing a master encoder/slave encoder step response during no load conditions and load conditions, respectively, for a master encoder and slave encoder forming part of the control system of FIG. 1; and FIGS. 4c and 4d are graphs showing the master encoder/slave encoder step response system during the first 500 ms of FIGS. 4a and 4b.

DETAILED DESCRIPTION OF THE EMBODIMENTS

Figure 1:
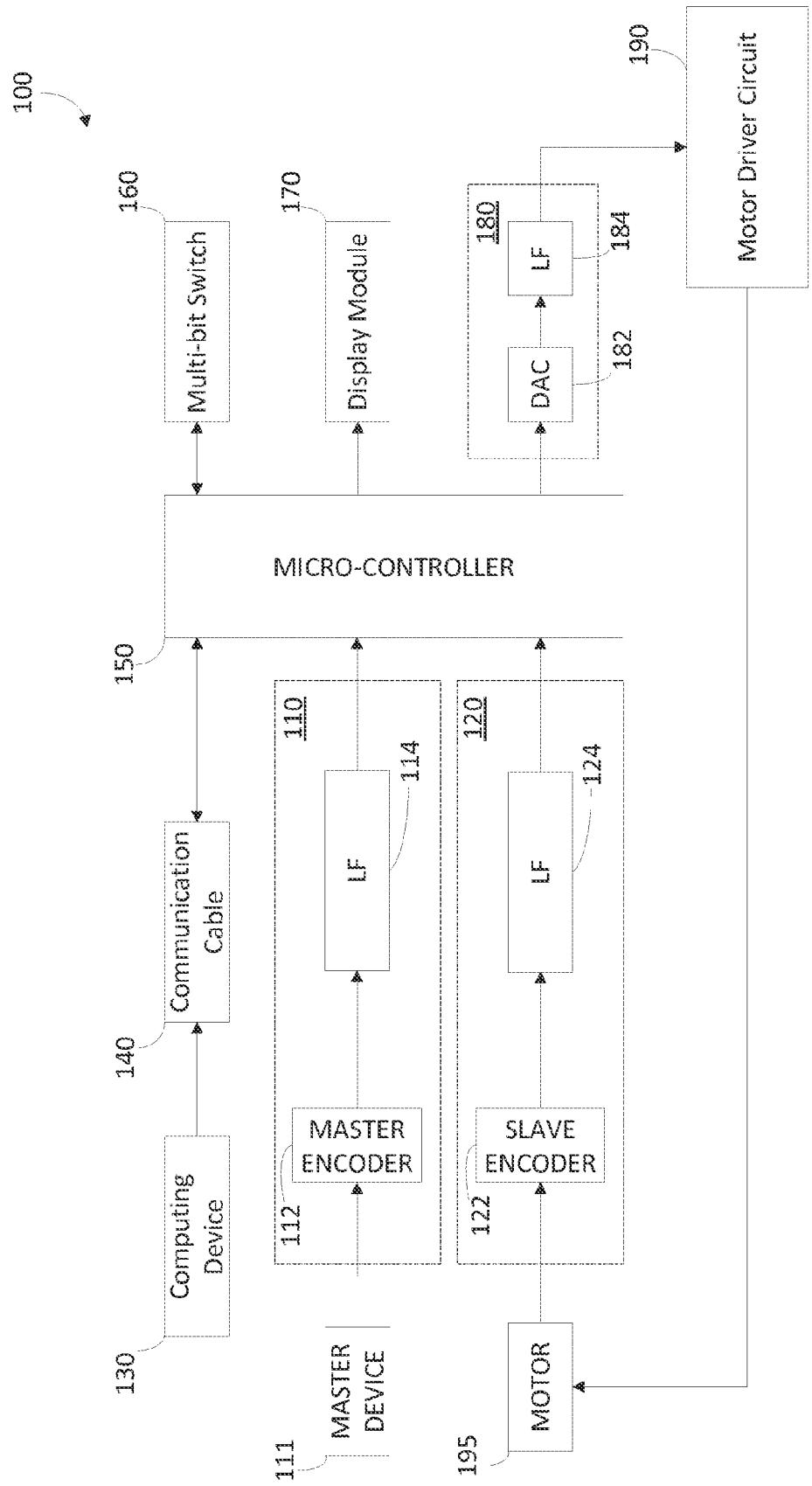
FIG. 1 is a schematic block diagram of a control system for ultrasonic motors.

Turning to FIG. 1, a schematic block diagram of a control system for ultrasonic motors is shown and is generally identified by reference numeral 100. The control system 100 comprises a master encoder module 110, a slave encoder module 120, a general purpose computing device 130, a communication cable 140, a microcontroller 150, a multi-bit switch 160, a display module 170, an output conditioning module 180, and a motor driver circuit 190 and an ultrasonic motor 195.

The master encoder module 110 receives input from a master device 111 manipulated by a user and comprises a master encoder 112 communicatively coupled to a low pass filter 114 which itself is communicatively coupled to the microcontroller 150. The master encoder 112 is coupled to the master device 111.

The slave encoder module 120 receives input from the ultrasonic motor 195 and comprises a slave encoder 122 communicatively coupled to a low pass filter 124 which itself is communicatively coupled to the microcontroller 150. The slave encoder 122 is coupled to a slave device (not shown) that tracks movement of the master device 111, as will be described.

The general purpose computing device 130 in this embodiment is a personal computer or other suitable processing device comprising, for example, a processing unit, system memory (volatile and/or non-volatile memory), other non-removable or removable memory (e.g. a hard disk drive, RAM, ROM, EEPROM, CD-ROM, DVD, flash memory, etc.) and a system bus coupling the various computer components to the processing unit. The general purpose computing device 130 may also comprise networking capabilities using Ethernet, WiFi, and/or other network formats, to enable access to shared or remote drives, one or more networked computers, or other networked devices.

The communication cable 140 is communicatively coupled between the general purpose computing device 130 and the microcontroller 150. In this embodiment, the communication cable 140 is a RS-232 cable that is used to provide serial communication and any required power conversion between the general purpose computing device 130 and the microcontroller 150.

The microcontroller 150 in this embodiment is an 8-bit microcontroller such as that manufactured by ATMEL™ running at a clock frequency of 8 MHz. The microcontroller 150 executes a method to control the operation of the ultrasonic motor 195, as will be described below.

The multi-bit switch 160 in this embodiment is an 8-bit binary switch that is communicatively coupled to the microcontroller 150 and is used to set various user selectable options, as will be described.

The display module 170 is a liquid crystal display (LCD) unit communicatively coupled to the microcontroller 150 and is used to view the output of the microcontroller 150.

The output conditioning module 180 is communicatively coupled to the microcontroller 150 and comprises a digital-to-analogue (DAC) converter 182 which itself is communicatively coupled to a low pass filter 184. The low pass filter 184 is communicatively coupled to the motor driver circuit 190.

The motor driver circuit 190 receives signals output by the microcontroller 150 and conditioned by the output conditioning module 180. The motor driver circuit 190 receives a signal from the output conditioning module 180 and processes the received signal to obtain a frequency value, which is used to set the rate of rotation of the ultrasonic motor 195. The motor driver circuit 190 also receives a direction bit from the output conditioning module 180 to determine a direction of rotation for the ultrasonic motor 195. The motor driver circuit 190 is communicatively coupled to the ultrasonic motor 195.

The ultrasonic motor 195 in this embodiment is an ultrasonic motor such as that manufactured by Clut (China) under the part number USM45-2C. The ultrasonic motor 195 receives signals from the motor driver circuit 190 and operates based on the received signals. The ultrasonic motor 195 adjusts the position of the slave encoder 122.

As mentioned previously, the microcontroller 150 executes a method to control the operation of the ultrasonic motor 195. Generally, the microcontroller 150 calculates an error value between the current position of the slave encoder 122 and a target position. The error value is used to condition the microcontroller 150 to operate as either a bang-bang controller or a proportional-integral-derivative (PID) controller. During operation as the bang-bang controller, the microcontroller 150 generates a control signal that has two extreme values: a maximum value and a minimum value. The bang-bang controller switches between these two maximum and minimum values for a Single Input Single Output (SISO) system. During operation as the PID controller, nonlinearities in the dynamics of the ultrasonic motor 195 are insignificant and the PID controller enables a smooth response of the ultrasonic motor 195 as the slave encoder 122 reaches the target position.

Figure 2:
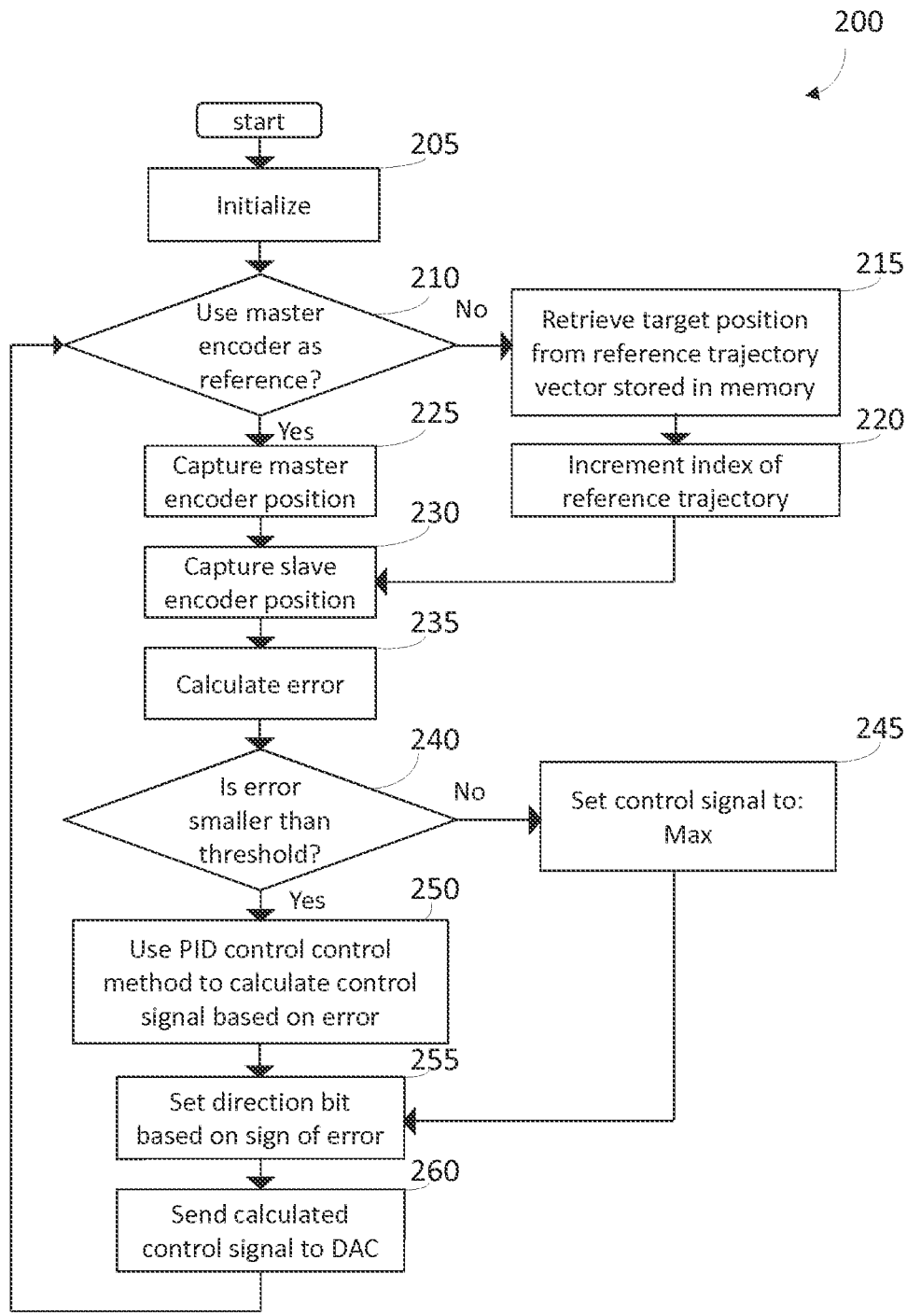
FIG. 2 is a flowchart showing a method executed by a microprocessor forming part of the control system of FIG. 1 for controlling the operation of an ultrasonic motor.

Turning now to FIG. 2, the method executed by the microcontroller 150 to control the operation of the ultrasonic motor 195 is shown and is generally identified by reference numeral 200. The method begins initializing the microcontroller 150 (step 205). A check is performed to determine if the position of the master encoder 112 is to be used as the target position for the slave encoder 122 (step 210). If the master encoder 112 is not to be used as the target position for the slave encoder 122, the target position is retrieved from a reference trajectory vector stored in the memory of the microcontroller 150 (step 215). In this embodiment, the target position is retrieved using a timer interrupt service routine. During the time interrupt service routine, the target position is retrieved periodically according to a predefined frequency. Once the target position is retrieved, the index of the reference trajectory vector is incremented (step 220), and the method continues to step 230. If the master encoder 112 is to be used as the target position for the slave encoder 122, the master encoder 112 position is captured using a first external interrupt pin of the microcontroller 150 (step 225). In this embodiment, each time a rising edge occurs on the first external interrupt pin, the master encoder 112 position is captured.

The position of the slave encoder 122 is captured using a second external interrupt pin of the microcontroller 150 (step 230). In this embodiment, each time a rising edge occurs on the second external interrupt pin, the slave encoder 122 position is captured. The error is calculated by comparing position of the slave encoder 122 and the target position (step 235). A check is performed to determine if the error is smaller than a threshold error value (step 240). If the error is not smaller than the threshold error value or, the microcontroller 150 operates as the bang-bang controller and the output control signal is calculated using equation 1 (step 245):

$$u = \text{maximum value} \quad [1]$$

If the error is smaller than or equal to the threshold error value, the microcontroller 150 operates as the PID controller and the output control signal is calculated using equation 2 (step 250):

$$u = K_p \text{error} + K_i \int (\text{error}) dt + K_d \frac{d}{dt} \text{error} \quad [2]$$

where u is the control signal, $K_p$ is the proportional gain of the PID controller, $K_i$ is integral gain of the PID controller, and $K_d$ is the derivative gain of the PID controller. In this embodiment, $K_p=20$, $K_i \approx 0$ and $K_d=0.33$.

The direction bit is set based on the sign of the calculated error (step 255). That is, the direction bit is based on whether the calculated error is positive or negative. The calculated control signal and the direction bit are communicated to output conditioning module 180 (step 260) and the method returns to step 210.

The output conditioning module 180 converts the control signal to an analogue signal using the DAC converter 182, and the resultant analogue signal is filtered via the low pass filter 184 to reduce jitters that may be present. The filtered analogue signal is communicated to the motor driver circuit 190. The direction bit is also communicated to the motor driver circuit 190.

The motor driver circuit 190 obtains the desired direction of rotation of the ultrasonic motor 195 from the direction bit. The motor driver circuit 190 converts the filtered analogue signal to a frequency value using a voltage to frequency converter. The motor driver circuit 190 outputs two sinusoidal waves to the ultrasonic motor 195. The phase difference between the two sinusoidal waves is representative of the direction of rotation of the ultrasonic motor 195. The frequency of the two sinusoidal waves is proportional to the speed of the ultrasonic motor 195. As the slave encoder 122 is coupled to the ultrasonic motor 195, the position of the slave encoder 122 is adjusted until it reaches the target position. As a result, the position of the slave device is adjusted to correspond to the position of the master device 111.

As mentioned previously, the multi-bit switch 160 is used to set various user selectable options. In this embodiment, the 8-bit binary value output by the multi-bit switch 160 is used to adjust the ratio of rotation between the master encoder 112 and the slave encoder 122. The first bit (bit 0) of the multi-bit switch 160 is used to indicate whether it is the master encoder 112 or the slave encoder 122 value that is being adjusted. The remaining bits (bits 1 to 6) are used to determine the ratio. For example, if bit 0 is set to a value of 1, it is indicated that the slave encoder 122 value is to be changed. If the remaining bits (bits 1 to 6) are set to a value of 001010, it is indicated that the ratio of the slave encoder 122 rotation to the master encoder 112 rotation is 10:1. Thus, for every 1° the master encoder 112 rotates, the slave encoder 122 rotates 10°. In this manner, the ratio of rotation between the master encoder 112 and the slave encoder 122 is controlled.

As will be appreciated, the control system may comprise any number of master encoders and slave encoders. For example, in an embodiment the control system comprises two master encoders and two slave encoders. In this embodiment, one master encoder and one slave encoder may be used to control motion in the radial direction and the other master encoder and the other slave encoder may be used to control motion in the axial direction. This embodiment may be used in medical applications, wherein a medical device such as for example a catheter or needle may be coupled to the slave encoders. In this embodiment, manipulation of the master encoders results in manipulation of the ultrasonic motors, which are coupled to the slave encoders. As a result, the position of the catheter or needle is adjusted. One possible application of this embodiment is for magnetic resonance (MR) imaging based surgery. The use of MR imaging during surgery limits both the operation space for the surgeon and the visual feedback during the operation. These issues may be addressed by incorporating an MR imaging compatible master/slave robot which captures the surgeon's motion as he/she manipulates a master system associated with the master encoders when positioned in the MR imaging console. The manipulation is replicated by the ultrasonic motors coupled to slave encoders which are positioned within the MR imaging scanner.

In another embodiment, the control system may be used with an MR imaging or multi-modality compatible phantom motion generator. In this embodiment, the control system may be used to actuate phantoms and/or targets within phantoms with manually applied motion profiles, or motion profiles previously loaded on the microcontroller or externally memory accessible by the microcontroller. One possible application of this embodiment is use with an imaging system to image moving targets.

In another embodiment, the control system may be used with an MR imaging or multi-modality compatible pump for mimicking bodily fluid flow in a repetitive format based on previously loaded flow profiles. These profiles may be repeated to generate a periodic flow profile such as that of the heart blood flow cycle.

In another embodiment, the control system may be used with an MR imaging guided high intensity focused ultrasonic (HIFU) treatment system having one or more transducers. In this embodiment, the position of each transducer may be controlled using the control system.

In another embodiment, the control system may be used for resolution of motion amplification. For example, the control system may be used for cell injection under various microscopic imaging systems.

Although in embodiments described above the control system is described as utilizing a microcontroller, those skilled in the art will appreciate that other types of processing devices may be used such as for example a field programmable gate array (FPGA) or a general purpose computing device having external ports and memory peripherals.

Although in embodiments described above the microcontroller is described as operating as a bang-bang controller or a PID controller, those skilled in the art will appreciate that the microcontroller may operate as another type of controller.

Although in embodiments described above, a multi-bit switch is used to control the ratio of rotation between the master encoder and the slave encoder, those skilled in the art will appreciate that other types of input devices may be used to control the ratio of rotation. For example, in another embodiment, a pair of potentiometers may be used, each of which is associated with one of the master and slave encoders.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1

Tests were performed under no-load conditions and load conditions as high as 0.11 Nm. The system step response for a 90° target position is shown in FIG. 4a for the no-load conditions and in FIG. 4b for the load conditions, wherein the load is 0.11 Nm. As can be seen, the control system maintains a minimal offset and a minimal overshoot. The control system has a rise time of approximately 100 ms, which is limited by the dynamics of the ultrasonic motor. In this example, the speed of the ultrasonic motor was 150 revolutions-per-minute. The curve has a slope of approximately 900 degrees/second, which illustrates that the ultrasonic motor is closing in on the target position with its maximum speed.

Example 2

To illustrate the capability of the control system 100 to follow a target point created by manual hand motion, a needle gauge was attached to the master encoder. The master encoder was rotated clock-wise from 0° to 180°, then counter clock wise back to 0° and then continued further counter clock wise to 180° to travel a total of 360° in one direction. This was repeated 40 times, until the master encoder was fixed at 0° at the end of the test. At this point, the angle of the slave encoder was read, and the error between the master and the slave was recorded. The total distance that the master encoder and slave encoder traveled was approximately: 40×360°=14400°. Based on the results the mean error between the master encoder and the slave encoder was 0.1°+/−1.1°.

Example 3

The master encoder was rotated clock-wise from 0° to 180°, then counter clock wise back to 0° and the continued further counter clock wise to 180° to travel a total of 360° in one direction. This was performed under a no-load condition and under a load of 0.11 Nm. FIG. 5a shows the rotation of the master encoder and the slave encoder over a time period of approximately 2 seconds under no-load conditions. FIG. 5c shows the rotation of the master encoder and the slave encoder over a time period of approximately 2 seconds under a load of 0.11 Nm. FIG. 5b shows in more detail the initial 500 ms of the rotation of FIG. 5a. FIG. 5d shows in more detail the initial 500 ms of the rotation of FIG. 5c. The master encoder and slave encoder were sampled at a rate of 29.472 Hz.

Although embodiments have been described above with reference to the accompanying drawings, those of skill in the art will appreciate that variations and modifications may be made without departing from the scope thereof as defined by the appended claims.

What is claimed is:

1. A method for controlling an ultrasonic motor coupled to a motor driver circuit, comprising:
   obtaining a position of a first encoder coupled to the ultrasonic motor;
   obtaining a position of a second encoder;
   determining a dynamic target position based on the position of the second encoder;
   calculating an error between the position of the first encoder and the dynamic target position; and
   repeating the obtaining, determining and calculating until the calculated error is equal to zero;
   wherein when the calculated error is greater than a threshold error value, sending a first control signal to the motor driver circuit to control the ultrasonic motor as a bang-bang controller to adjust the position of the first encoder; and
   wherein when the calculated error is less than the threshold error value, sending a second control signal to the motor driver circuit to control the ultrasonic motor as a proportional integral derivative controller to adjust the position of the first encoder.

2. The method of claim 1 wherein the first control signal adjusts the speed of the ultrasonic motor to a maximum value.

3. The method of claim 1 wherein the second control signal adjusts the speed of the ultrasonic motor based on a proportional integral derivative.

4. The method of claim 1 comprising determining a direction of rotation of the ultrasonic motor based on a sign of the calculated error.

5. The method of claim 4 wherein in the event that the sign of the calculated error is negative, the method further comprising adjusting the direction of rotation of the ultrasonic motor to be counter clockwise.

6. The method of claim 4 wherein in the event that the sign of the calculated error is positive, the method further comprising adjusting the direction of rotation of the ultrasonic motor to be clockwise.

7. The method of claim 1 wherein obtaining the position of the first encoder comprises calling a first interrupt service routine.

8. The method of claim 1 wherein obtaining the position of the second encoder comprises calling a second interrupt service routine.

9. A control system comprising:
   an ultrasonic motor coupled to a motor driver circuit;
   a first encoder coupled to the ultrasonic motor;
   a second encoder coupled to the motor
   processing structure configured to:
      obtain positions of the first and second encoders;
      determine a dynamic target position based on the position of the second encoder;
      calculate an error between the position of the first encoder and the dynamic target position; and
      repeating the obtaining, determining and calculating until the calculated error is equal to zero;
      wherein when the calculated error is greater than a threshold error value, the processing structure is configured to send a first control signal to the motor driver circuit to control the ultrasonic motor as a bang-bang controller to adjust the position of the first encoder; and
      wherein when the calculated error is less than the threshold error value, the processing structure is configured to send a second control signal to the motor driver circuit to control the ultrasonic motor as a proportional integral derivative controller to adjust the position of the first encoder.

10. The control system of claim 9 wherein the first control signal adjusts the speed of the ultrasonic motor to a maximum value.

11. The control system of claim 9 wherein the second control signal adjusts the speed of the ultrasonic motor based on a proportional integral derivative.

12. A non-transitory computer readable medium embodying a computer program having computer program code for execution by a computer to perform a method for controlling an ultrasonic motor coupled to a motor driver circuit, the method comprising:
   obtaining a position of a first encoder coupled to the ultrasonic motor;
   obtaining a position of a second encoder;
   determining a dynamic target position based on the position of the second encoder;
   calculating an error between the position of the first encoder and the dynamic target position; and
   repeating the obtaining, determining and calculating until the calculated error is equal to zero;
   wherein when the calculated error is greater than a threshold error value, sending a first control signal to the motor driver circuit to control the ultrasonic motor as a bang-bang controller to adjust the position of the first encoder; and
   wherein when the calculated error is less than the threshold error value, sending a second control signal to the motor driver circuit to control the ultrasonic motor as a proportional integral derivative controller to adjust the position of the first encoder.

13. The non-transitory computer readable medium of claim 12, wherein the first control signal adjusts the speed of the ultrasonic motor to a maximum value.

14. The non-transitory computer readable medium of claim 12, wherein the second control signal adjusts the speed of the ultrasonic motor based on a proportional integral derivative.

* * * * *